UNITED STATES PATENT OFFICE.

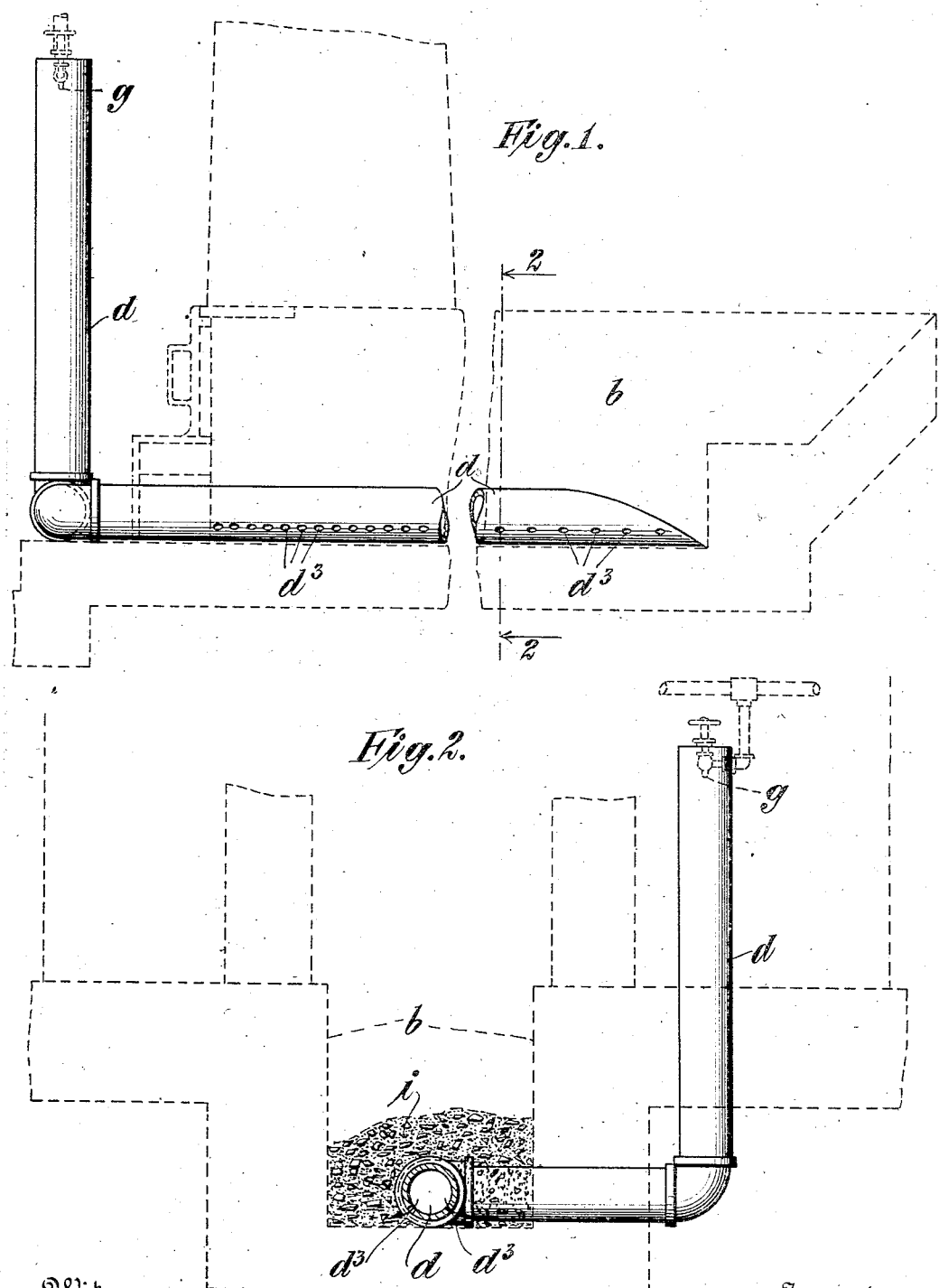

HENRY O. ROBINSON, OF BROOKLINE, MASSACHUSETTS, AND CHRISTOPHER STEADMAN, OF HUGUENOT PARK, NEW YORK.

BRICK-BURNING.

1,168,557.   Specification of Letters Patent.   Patented Jan. 18, 1916.

Application filed April 17, 1911. Serial No. 621,673.

*To all whom it may concern:*

Be it known that we, HENRY O. ROBINSON, a citizen of the United States, and a resident of Brookline, in the county of Norfolk and State of Massachusetts, and CHRISTOPHER STEADMAN, a subject of the King of Great Britain, residing at Huguenot Park, in the county of Richmond and State of New York, have invented an Improvement in Brick-Burning, of which the following is a specification, reference being had to the accompanying drawings, forming a part hereof.

The present improvements are directed to the delivery or distribution of a forced-draft to a body of fuel in such a manner that the draft shall be distributed uniformly throughout the fuel-body, the invention having been devised with the object of improving conditions in brick-burning furnaces when forced-draft methods are used.

In the accompanying drawings where the invention is sufficiently illustrated to enable it to be readily comprehended, Figure 1 is a view in side elevation of a portion of a draft-conduit, showing its relation to a fire-box indicated in dotted lines, and, Fig. 2 is a sectional view, the plane of section being indicated by the lines 2—2 in Fig. 1, and the fuel-body also being appropriately indicated.

The draft being generated in any suitable manner, it is conveyed into a conduit $d$ which is located within the body of fuel $i$ and preferably underneath such fuel which covers it at the top and sides (Fig. 2). This conduit may consist of a pipe closed at one end by being hammered down to a chisel edge (Fig. 1) and being of such a shape as to extend throughout the fuel-body. It is provided with a plurality of perforations throughout its length, and these perforations are so located as to deliver the draft downwardly, that is, not necessarily in a vertical direction, but in such a way as to prevent the draft from being blown outward and upward from the pipe directly through the fire. Where the latter operation occurs, the force of the draft causes it to shoot out straight from the apertures and, with comparatively little spreading, to work its way through the fuel and out; and in such a case it would require exceedingly numerous and fine perforations in the pipe in order to distribute the draft uniformly throughout the fuel-body. But by directing the draft downwardly, it is compelled to reverse its course before it reaches and penetrates the unconsumed fuel, whereby the several jets, constituting the draft as it is ejected from the pipe $d$, unite and form a homogeneous draft column which ascends throughout the fuel-body.

By arranging the pipe $d$ upon or near the bottom of the fire-box $b$, as shown in the drawing, and locating the perforations $d^3$ along each side thereof near the bottom, the bottom of the fire-box acts as a sort of baffle for the draft-jets, spreading the draft out ultimately into a homogeneous column. It will be understood that various forms of apparatus will be capable of use in carrying out the improved method which is obviously independent of any particular mechanism.

In the present case, a steam jet is indicated at $g$ for creating the forced-draft, whereby air is entrained into the open end of the pipe $d$ and a mixture of air and steam introduced within the fuel mass. The regulation of the draft may be effected from a valve (shown above the jet $g$) so that, in effect, the regulation of the draft takes place while it is within the fuel mass. The delivery and regulation of the draft in this way insures that no relatively cool air or gases may find their way up through the kiln to hinder or otherwise affect the burning or the quality of the burned brick.

As it is obvious that at different times, ashes or other matter as distinguished from green coal or burnable fuel, will surround or partially embed the pipe, either as a result of combustion or through having been placed there intentionally in the first instance, the terms "fuel-mass" and "fuel-body" used throughout the specification and claims will be understood to include whatever mass surrounds the pipe $d$.

From the foregoing description, it will be evident that in accordance with our method of distributing a forced draft throughout the fuel in a brick kiln, we discharge from within the fuel bed a supply of air or other suitable gas and scatter the air or other gas throughout the fuel bed, so as to cause it to be disseminated among the particles of fuel before it issues from the fuel bed, whereby the air or other gas may be combined with the fuel to effect development of combustible gases uniformly throughout the entire fuel area. We convey the draft into the interior of each fuel bed, delivering the draft therein at a number of points throughout the fuel bed and scatter the draft before it reaches the surface of the fuel bed, thereby effecting comminution of the draft and promoting uniform and complete combustion of the fuel without blowing holes in the surface. In carrying out our method, we deliver the draft into the interior of the fuel bed and preferably discharge the draft into the fuel or substantially the bottom of the fuel bed, and cause the draft so discharged to reverse its course to a substantial extent before reaching the surface of the fuel bed, thereby scattering the draft throughout the particles of the fuel and promoting uniform and complete combustion of the fuel. In carrying out our method, as hereinbefore set forth, we convey the draft within the fuel bed in the furnace, delivering it downwardly therein and subjecting the brick to be burned to the gases of combustion developed thereby.

We claim as our invention:

1. The method of promoting combustion of fuel in brick kilns, which consists in discharging from within the fuel bed a supply of air or other suitable gas, and scattering the air or other gas throughout the fuel bed so as to cause it to be disseminated among the particles of fuel before it issues from the fuel bed, whereby the air or other gas may be combined with the fuel to effect development of combustible gases uniformly throughout the entire fuel area.

2. The method of distributing a forced draft throughout the fuel in a brick kiln, which consists in conveying the draft into the interior of each fuel bed, delivering the draft therein at a number of points throughout the fuel bed, and scattering the draft before it reaches the surface of the fuel bed, thereby effecting comminution of the draft and promoting uniform and complete combustion of the fuel without blowing holes in its surface.

3. The method of distributing a forced draft throughout the fuel in a brick kiln, which consists in delivering the draft into the interior of a fuel bed, discharging the draft into the fuel substantially at the bottom of the fuel bed, and causing the draft so discharged to reverse its course to a substantial extent before reaching the surface of the fuel bed, thereby scattering the draft throughout the particles of fuel and promoting uniform and complete combustion of the fuel.

4. The method of burning brick in a forced draft furnace, which comprises the conveying of the draft within the fuel bed in the furnace, delivering it downwardly therein, and subjecting the brick to be burned to the gases of combustion developed thereby.

This specification signed and witnessed this 25th day of March, A. D., 1911.

HENRY O. ROBINSON.
CHRISTOPHER STEADMAN.

Signed in the presence of—
JOHN W. THOMPSON,
FRANCIS L. VARNEY.